(12) United States Patent
Duan et al.

(10) Patent No.: US 10,286,772 B2
(45) Date of Patent: May 14, 2019

(54) POWERTRAIN INCLUDING AN ELECTRIC MACHINE, AN INTERNAL COMBUSTION ENGINE AND A CONTINUOUSLY VARIABLE TRANSMISSION

(71) Applicant: GM GLOBAL TECHNOLOGY OPERATIONS LLC, Detroit, MI (US)

(72) Inventors: Chengwu Duan, Shanghai (CN); Jian Yao, Shanghai (CN); Zhen Gao, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 303 days.

(21) Appl. No.: 15/421,688

(22) Filed: Feb. 1, 2017

(65) Prior Publication Data
US 2018/0215249 A1   Aug. 2, 2018

(51) Int. Cl.
| | |
|---|---|
| B60K 6/543 | (2007.10) |
| F16H 9/16 | (2006.01) |
| B60K 6/365 | (2007.10) |
| B60K 6/48 | (2007.10) |
| F16H 57/04 | (2010.01) |
| F16H 61/00 | (2006.01) |
| F16H 61/662 | (2006.01) |

(52) U.S. Cl.
CPC .............. *B60K 6/543* (2013.01); *B60K 6/365* (2013.01); *B60K 6/48* (2013.01); *F16H 9/16* (2013.01); *F16H 57/0439* (2013.01); *F16H 57/0489* (2013.01); *F16H 61/0028* (2013.01); *B60Y 2200/92* (2013.01); *B60Y 2400/72* (2013.01); *B60Y 2400/73* (2013.01); *B60Y 2400/785* (2013.01); *F16H 61/662* (2013.01); *Y10S 903/91* (2013.01); *Y10S 903/918* (2013.01)

(58) Field of Classification Search
CPC . B60K 6/543; F16H 61/0028; Y10S 903/918; B60Y 2400/785
See application file for complete search history.

(56) References Cited

U.S. PATENT DOCUMENTS

| | | | |
|---|---|---|---|
| 8,671,801 B2 * | 3/2014 | Oki | B60K 6/383 74/661 |
| 2009/0286643 A1 | 11/2009 | Brown | |

(Continued)

FOREIGN PATENT DOCUMENTS

JP    2004011819 A  *  1/2004

*Primary Examiner* — Sherry L Estremsky
(74) *Attorney, Agent, or Firm* — Quinn IP Law

(57) ABSTRACT

A powertrain includes an internal combustion engine, an electric machine including a rotor, a geartrain including a pump drive mechanism, a first clutch and a second clutch and a variator for a continuously variable transmission (CVT). The internal combustion engine is rotatably coupled to the rotor of the electric machine by activation of a second clutch. The internal combustion engine is rotatably coupled to the variator by activation of first and second clutches. The rotor of the electric machine is rotatably coupled to the variator by activation of the first clutch, and the electric machine is operative in either a forward direction or a reverse direction. The geartrain is disposed to operate the pump drive mechanism to drive a fluidic pump in a first direction when the electric machine is operating in the forward direction and when the electric machine is operating in the reverse direction.

19 Claims, 1 Drawing Sheet

(56) References Cited

U.S. PATENT DOCUMENTS

2013/0191012 A1 7/2013 Hirotsu et al.
2014/0190455 A1* 7/2014 Ootsuki .................. B60L 15/20
　　　　　　　　　　　　　　　　　　　　　123/497
2015/0300469 A1 10/2015 Singh et al.

* cited by examiner

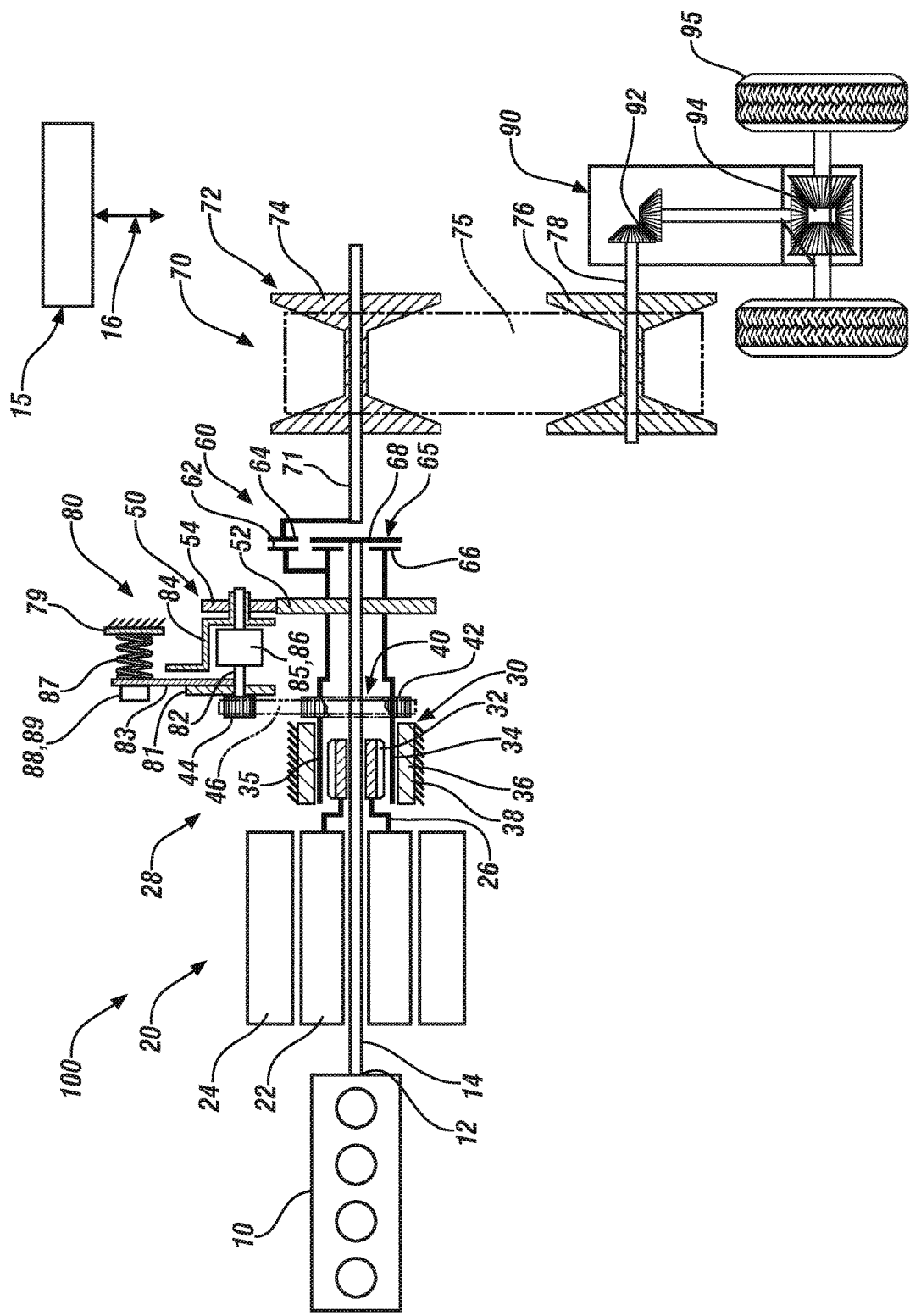

POWERTRAIN INCLUDING AN ELECTRIC MACHINE, AN INTERNAL COMBUSTION ENGINE AND A CONTINUOUSLY VARIABLE TRANSMISSION

INTRODUCTION

Powertrain configurations may include mechanisms for generating and transferring mechanical, electrical and hydraulic power.

SUMMARY

A powertrain is described, and includes an internal combustion engine including a crankshaft coupled to a first input member, an electric machine including a rotor, a geartrain including a pump drive mechanism, a first clutch and a second clutch, a variator for a continuously variable transmission (CVT), and a fluidic pump that is fluidly connected to the variator and rotatably operatively coupled to the electric machine via the pump drive mechanism of the geartrain. The variator includes an intermediate member and an output member. The first input member of the internal combustion engine is rotatably coupled to the rotor of the electric machine by activation of the second clutch. The first input member of the internal combustion engine is rotatably coupled to the intermediate member by activation of the first and second clutches. The rotor of the electric machine is rotatably coupled to the intermediate member by activation of the first clutch, and the electric machine is operative in either a forward direction or a reverse direction. The geartrain is disposed to operate the fluidic pump in a first direction when the electric machine is operating in the forward direction and when the electric machine is operating in the reverse direction.

One aspect of the disclosure includes the variator having an output member coupled to a driveline, wherein the powertrain is disposed to operate in an electric vehicle mode, including the electric machine being disposed to operate in a forward direction of rotation to transfer torque from the electric machine to the CVT when the first clutch is activated and the second clutch is deactivated. This may include the powertrain being disposed to operate in an electrically variable mode, including the internal combustion engine and the electric machine being disposed to transfer torque to the CVT when the first and second clutches are activated. This may also include the powertrain being disposed to control operate in an engine cranking mode, including the electric machine being disposed to crank the engine when the second clutch is activated and the first clutch is deactivated. This may also include the powertrain being disposed to operate in the electric vehicle mode in a reverse direction of travel, including controlling the electric machine to operate in a reverse direction of rotation to transfer torque from the electric machine to the CVT when the first clutch is activated and the second clutch is deactivated.

Another aspect of the disclosure includes the geartrain further comprising a first gear drive, a second gear drive and a third gear drive, wherein the pump drive mechanism includes a rotating member coupled to an impeller of the fluidic pump, and wherein the second and third gear drives are rotatably couplable to the rotating member of the pump drive mechanism.

Another aspect of the disclosure includes the first gear drive including a planetary gear set including a sun gear, a plurality of planet gears rotatably coupled to a carrier, and a ring gear, wherein the sun gear is coupled to the rotor of the electric machine and wherein the carrier is coupled to a first gear element of the second gear drive, a first element of the second clutch, and a first element of the first clutch.

Another aspect of the disclosure includes the ring gear being coupled to a transmission ground.

Another aspect of the disclosure includes the second gear drive including a first gear element rotatably coupled to a second gear element, wherein the second gear element is coupled to the rotating element of the pump drive mechanism.

Another aspect of the disclosure includes the first gear element being rotatably coupled to the second gear element via a mechanism that is disposed to rotate the second gear element in the same direction as the rotation of the first gear element.

Another aspect of the disclosure includes the first gear element being rotatably coupled to the second gear element via a chain drive or a belt drive.

Another aspect of the disclosure includes the third gear drive being a third gear element rotatably coupled to a fourth gear element, wherein the fourth gear element is coupled to the rotating element of the pump drive mechanism.

Another aspect of the disclosure includes the third gear element being rotatably coupled to the fourth gear element via a mechanism that is disposed to rotate the fourth gear element in a rotational direction that is opposite to the rotational direction of the third gear element.

Another aspect of the disclosure includes the third and fourth gear elements comprising meshingly engaged spur or helical gear elements.

Another aspect of the disclosure includes the second gear drive including a first gear element rotatably coupled to a second gear element, wherein the second gear element is coupled to the rotating element of the pump drive mechanism, the first gear element is rotatably coupled to the second gear element via a mechanism that is disposed to rotate the second gear element in a direction that is opposite to the rotational direction of the first gear element, and the third gear drive includes a third gear element rotatably coupled to a fourth gear element, wherein the fourth gear element is coupled to the rotating element of the pump drive mechanism. This includes the third gear element being rotatably coupled to the fourth gear element via a mechanism that is disposed to rotate the fourth gear element in the same rotational direction as the rotational direction of the third gear element.

Another aspect of the disclosure includes the first input member of the internal combustion engine being coupled to a second element of the first clutch and a third gear element of the third gear drive.

Another aspect of the disclosure includes the pump drive mechanism having a first clutch backplate, a second clutch backplate and a clutch plate, and a reverse/forward actuator operatively coupled to the first and second backplates, wherein the reverse/forward actuator is disposed to engage the first clutch backplate to the clutch plate to rotate the rotating member coupled to the impeller to operate the fluidic pump in the first direction when the electric machine is transferring mechanical power to the intermediate member in the forward direction;

Another aspect of the disclosure includes the reverse/forward actuator being disposed to engage the second clutch backplate to the clutch plate to rotate the rotating member coupled to the impeller to operate the fluidic pump in the first direction when the electric machine is transferring mechanical power to the intermediate member in the reverse direction.

Another aspect of the disclosure includes the fluidic pump being disposed to transfer pressurized fluid to the variator when the pump drive mechanism operates the fluidic pump in the first direction.

Another aspect of the disclosure includes the geartrain including the pump drive mechanism being disposed to operate the fluidic pump in a forward direction when the electric machine is transferring mechanical power to the intermediate member in the forward direction and when the electric machine is transferring mechanical power to the intermediate member in the reverse direction.

Another aspect of the disclosure includes a device that is disposed to transfer torque originating from first and second torque generating devices to a driveline, wherein the device includes a geartrain rotatably coupled to a variator of a continuously variable transmission (CVT). The geartrain includes a first input member, a second input member, a first gear drive, a second gear drive, a third gear drive, a pump drive mechanism, a first clutch, a second clutch and an intermediate member. The variator includes a first pulley that is rotatably coupled to a second pulley via a flexible continuous belt, wherein the first pulley rotatably couples to the intermediate member and wherein the second pulley rotatably couples to the driveline. The pump drive mechanism includes a rotating member coupled to an impeller of a fluidic pump, wherein the second and third gear drives are rotatably couplable to the rotating member of the pump drive mechanism. The fluidic pump is disposed to supply pressurized fluid to the variator and is selectively rotatably coupled to one of the first and second input members via the pump drive mechanism of the geartrain. The first input member is rotatably coupled to the intermediate member by activation of the first and second clutches. The second input member is rotatably coupled to the intermediate member by activation of the first clutch. The pump drive mechanism is disposed to operate the fluidic pump in a first direction when the second input member is rotating in a forward direction and when the second input member is rotating in a reverse direction. The first input member is coupled to the first torque generating device and wherein the second input member is coupled to the second torque generating device.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 1 schematically shows a powertrain that is arranged to provide propulsion power to a driveline, in accordance with the disclosure.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is understood in the related art has not been described in detail in order to avoid unnecessarily obscuring the disclosure. Furthermore, the drawing is in simplified form and is not to precise scale. For purposes of convenience and clarity only, directional terms may be used with respect to the drawing. As employed herein, the terms "forward" and "reverse", and related terms refer to nominal directions of travel associated with operation of a vehicle. These and similar directional terms are not to be construed to limit the scope of the disclosure. Furthermore, the disclosure, as illustrated and described herein, may be practiced in the absence of an element which is not specifically disclosed herein.

FIG. 1 consistent with embodiments disclosed herein, schematically illustrates a powertrain 100 that is arranged to provide propulsion power via a driveline 90 to a vehicle, wherein the propulsion power is supplied by either a first torque generating device, a second torque generating device, or both the first and second torque generating devices. In one embodiment, and as described herein, the first torque generating device is an internal combustion engine (engine) 10, and the second torque generating device is an electric machine 20. As such, the powertrain 100 preferably includes the engine 10 and the electric machine 20, which generate and transfer torque to the driveline 90 via a geartrain 28, a first clutch 60, a second clutch 65, a continuously variable transmission (CVT) 70 including a variator 72, and a CVT pump drive mechanism 80 that includes a fluidic pump 85. The fluidic pump 85 is fluidly coupled to and disposed to supply pressurized hydraulic fluid to elements of the variator 72 to effect its operation. The fluidic pump 85 is rotatably coupled to a rotor 22 of the electric machine 20 via the CVT pump drive mechanism 80. The electric machine 20 is configured to operate in both a forward direction and a reverse direction to transfer mechanical power to the driveline 90. The CVT pump drive mechanism 80 is arranged to operate the fluidic pump 85 in a first direction when the electric machine 20 is transferring mechanical power to the variator 72 of the CVT 70 in a forward direction and when the electric machine 20 is transferring mechanical power to the variator 72 of the CVT 70 in the reverse direction.

The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The driveline 90 is depicted as including a final drive gear 92 and a differential 94 that is configured to transfer mechanical power to vehicle wheels 95, and may instead include suitable configurations such as another mechanical drive, e.g., a chain drive mechanism, or a hydrostatic drive mechanism.

The engine 10 is preferably configured as a multi-cylinder internal combustion engine that converts fuel to mechanical torque through a thermodynamic combustion process. The engine 10 is equipped with a plurality of actuators and sensing devices for monitoring operation and delivering fuel to form in-cylinder combustion charges that generate an expansion force onto pistons, with such force transferred to a crankshaft 12 to produce torque that is transferred via a first input member 14. The first input member 14 couples to a second element 68 of the second clutch 65. Operation of the engine 10 is controlled by an engine controller (ECM) 15.

The electric machine 20 is preferably a multi-phase electric motor/generator configured to convert stored electric energy to mechanical power and convert mechanical power to electric energy that may be stored in a DC power source (not shown). The DC power source may be configured at a nominal 48V DC voltage level in one embodiment. Alternatively, the DC power source may be configured at a nominal 300V DC voltage level, or another suitable voltage level, as may be selected. The electric machine 20 preferably includes a rotor 22 and a stator 24, and electrically connects via an inverter module (not shown) to the DC power source. The electric machine 20 can be controlled to operate in a first direction of rotation or a second direction of rotation by operation of the inverter module. Another non-combustion torque machine, such as a pneumatically-powered device or a hydraulically-powered device may be employed in place of the electric machine 20. By way of definition, a non-combustion torque machine is a device that is capable of generating torque by converting a potential energy source to kinetic energy without combustion of the potential energy. Non-limiting examples of the potential energy source may include electric energy, pneumatic energy and hydraulic energy. Pneumatically-powered devices and hydraulically-powered devices are not described in detail herein.

The variator 72 of the CVT 70 may be configured as a belt-driven variator, or alternatively, a toroidal variator or another suitable variator configuration. Belt-driven variators and toroidal variators are not described in detail herein. By way of a non-limiting embodiment, and as illustrated, the variator 72 of CVT 70 is in the form of a belt-driven variator that includes a first pulley 74 that is rotatably coupled to a second pulley 76 via a flexible continuous belt 75 that transfers torque therebetween. The first pulley 74 rotatably couples to an intermediate member 71 and the second pulley 76 rotatably couples to a CVT output member 78. The CVT output member 78 is coupled to the driveline 90 to transfer mechanical power thereto. The fluidic pump 85 is fluidly coupled to elements of the CVT 70 to supply pressurized hydraulic fluid via a hydraulic circuit in response to control signals that are communicated via communication lines 16 from the controller 15. Other elements of the CVT 70 are not described in detail herein. The first pulley 74 and the intermediate member 71 rotate about a first axis, and the second pulley 76 and the CVT output member 78 rotate about a second axis. The belt 75 may be a belt, a chain, or another suitable flexible continuous device. One of the first and second pulleys 74, 76 is controlled to act as a ratioing pulley to establish a speed ratio and the other of the first and second pulleys 74, 76 is controlled to act as a clamping pulley to generate sufficient clamping force to transfer torque therebetween. As used herein, the term 'speed ratio' refers to a variator speed ratio, which is a ratio of the variator output speed and the variator input speed. An underdrive speed ratio occurs when rotational speed of the variator output speed is less than the rotational speed of the variator input speed, and an overdrive speed ratio occurs when rotational speed of the variator output speed is greater than the rotational speed of the variator input speed.

In certain embodiments, each of the first and second pulleys 74, 76 may be split perpendicular to its axis of rotation to define an annular first groove that is formed between a moveable sheave and a stationary sheave. The moveable sheave axially moves or translates along the axis of rotation relative to the stationary sheave. The stationary first sheave is disposed opposite the moveable first sheave. The moveable first sheave and the stationary first sheave each include a first groove surface. The first groove surfaces of the moveable first sheave and the stationary first sheave are disposed opposite each other to define an annular groove therebetween. The opposed grooved surfaces preferably form an inverted frustoconical shape such that a movement of the moveable sheave towards the stationary sheave increases an outer pulley diameter of the annular first groove. An actuator is arranged with the pulley to control an axial position of the moveable sheave in response to a drive signal, including urging the moveable sheave towards the stationary sheave. In one embodiment, the actuator is a hydraulically-controlled device, e.g., a valve that fluidly couples to the hydraulic circuit and the drive signal is a hydraulic pressure signal. Other elements, such as clutch assemblies in the form of selectable one-way clutches and the like may be deployed between the CVT 70 and other powertrain and driveline components and systems.

The first input member 14 of the engine 10, the rotor 22 of the electric machine 20 and certain members of the geartrain 28 are coaxially arranged in one embodiment. Furthermore, the aforementioned elements are coaxially arranged with the intermediate member 71 in one embodiment. Furthermore, a second element 64 of the first clutch 60 couples to the intermediate member 71.

The geartrain 28 preferably includes a first gear drive 30, a second gear drive 40 and a third gear drive 50. The first gear drive 30 is disposed to transfer torque and mechanical power between the engine 10, the electric machine 20 and the intermediate member 71 via selective activation of the first and second clutches 60, 65 to effect operation of the powertrain 100 in one of various operating modes. In one embodiment and as described herein, the first gear drive 30 may be configured as a planetary gear set that includes a sun gear 32, a plurality of planet gears 34 and an associated carrier 35, and a ring gear 36. The sun gear 32 is arranged coaxially with the first input member 14, preferably via a sleeved arrangement, and is coupled to the rotor 22 via a second input member 26. The carrier 35 is coupled to the first element 62 of the first clutch 60 and also coupled to the first element 66 of the second clutch 65. FIG. 1 depicts the carrier 35 as being directly coupled to the first element 62 of the first clutch 60 and to the first element 66 of the second clutch 65, for ease of illustration. It is appreciated that there may be intervening meshed gear elements and rotatable shaft elements that provide suitable mechanical couplings of the various members to accommodate elements of the second and third gear drives 40, 50. The ring gear 36 is grounded to a transmission case 38.

The second gear drive 40 preferably includes a first gear element 42 that is rotatably coupled to a second gear element 44 such that the first and second gear elements 42, 44 rotate in the same direction. The first and second gear elements 42, 44 are rotatably coupled via a chain 46 or another suitable arrangement. The first gear element 42 is preferably arranged coaxially with the first input member 14, and is coupled to the carrier 35 of the first gear drive 30. The second gear element 44 is selectively rotatably coupled to a rotating member 82 of the CVT pump drive mechanism 80. The third gear drive 50 preferably includes a third gear element 52 that is rotatably coupled to a fourth gear element 54 such that the third gear element 52 rotates in a direction that is opposite to the direction of rotation of the fourth gear element 54. The third and fourth gear elements 52, 54 may be spur gears in one embodiment, or helical gears or another suitable arrangement. The third gear element 52 is preferably arranged coaxially with and coupled to the first input member 14. The fourth gear element 54 is also selectively rotatably coupled to the rotating member 82 of the CVT pump drive mechanism 80. Alternatively, the second gear drive 40 includes the first gear element 42 rotatably coupled to the second gear element 44 such that the first and second gear elements 42, 44 rotate in opposite directions, and the third gear drive 50 includes the third gear element 52 rotatably coupled to the fourth gear element 54 such that the third gear element 52 rotates in the same direction as the direction of rotation of the fourth gear element 54.

The first and second clutches 60, 65, respectively are controllable devices that are configured to transfer torque between their respective first and second elements. A "clutch" can be a selectively activatable and deactivatable torque transfer device that employs friction, mechanical interference or another suitable force to couple devices, including rotatably coupling coaxial devices.

The CVT pump drive mechanism 80 includes the rotating member 82 that couples to an impeller 86 of the fluidic pump 85. The fluidic pump 85 may be configured as a rotary pump that includes a stator element and impeller 86 to transfer fluid from a pump inlet to a pump outlet with rotation of the impeller 86. A clutching arrangement includes a clutch plate 83, a first clutch backplate 81 and a second clutch backplate 84. The first and second clutch backplates 81, 84 are preferably arranged to be co-axial with and connected to the rotating member 82 to rotate in concert therewith. A compression spring 87 is disposed between the first clutch backplate 81 and a CVT case or housing 79 to urge the first clutch backplate 81 against a hydraulic piston that is associated with a PRND valve 88 and associated accumulator 89. The PRND valve 88 includes a manually-set valve that is connected to a normally-on clutch and piston that are actuated by the accumulator 89 in one embodiment. When the PRND valve 88 is in a first position associated with a command for forward direction of travel, the action of the spring 87 against the clutch plate 83 urges the clutch plate 83 against the first clutch backplate 81 to engage and spin the rotating member 82 via the second gear element 44 of the second gear drive 40. This causes the electric machine 20 to rotate the fluidic pump 85 in the first direction via the second gear drive 40 and thus operate the CVT pump drive mechanism 80. When the PRND valve 88 is in a second position associated with a command for reverse direction of travel, a hydraulic piston associated with the PRND valve 88 overcomes the force of the spring 87 and instead urges the clutch plate 83 against the second clutch backplate 84 to engage and spin the rotating member 82 via the fourth gear element 54 of the third gear drive 50. This causes the electric machine 20 to again rotate the fluidic pump 85 in the first direction via the third gear drive 50, and thus operate the CVT pump drive mechanism 80.

The powertrain 100 is disposed to operate in various modes, including an electric vehicle (EV) mode and an electrically-variable hybrid vehicle (HV) mode. The powertrain 100 is also disposed to operate in an engine crank (EC) mode, which may be part of an autostart/autostop operation.

The EV mode may be associated with operating the powertrain 100 in either a forward direction of travel or a reverse direction of travel. The EV mode is enabled by activating the first clutch 60 and deactivating the second clutch 65. As such, the electric machine 20 couples via the first gear drive 30 to the CVT 70 to transfer mechanical power to the driveline 90 for tractive effort. When the PRND valve 88 is commanded to the first position that is associated with a command for the forward direction of travel, the electric machine 20 is controlled to operate in the first direction of rotation, and the CVT pump drive mechanism 80 is controlled such that the clutch plate 83 is urged against the first clutch backplate 81 to engage and spin the rotating member 82 via the second gear element 44 of the second gear drive 40. This causes the electric machine 20 to rotate the fluidic pump 85 in the first direction via the second gear drive 40 to supply pressurized hydraulic fluid to operate the CVT 70. When the PRND valve 88 is commanded to the second position associated with the command for reverse direction of travel, the PRND valve 88 urges the clutch plate 83 against the second clutch backplate 84 to engage and spin the rotating member 82 via the fourth gear element 54 of the third gear drive 50. This causes the electric machine 20 to continue to rotate the fluidic pump 85 in the first direction via the third gear drive 50 to supply pressurized hydraulic fluid to operate the CVT 70.

The HV mode may be associated with operating the powertrain 100 in the forward direction of travel, and is enabled by activating the first clutch 60 and the second clutch 65. As such, the electric machine 20 couples via the first gear drive 30 to the CVT 70 and the engine 10 to transfer mechanical power to the driveline 90. In the HV mode, the electric machine 20 may be controlled to operate in a torque-generating state, wherein both the engine 10 and electric machine 20 combine to generate torque that is transferred to the CVT to transfer mechanical power to the driveline 90 for tractive effort. In the HV mode, the electric machine 20 may instead be controlled to operate in an electric power-generating state, wherein the engine 10 generates torque that is transferred to the CVT to transfer mechanical power to the driveline 90 for tractive effort, and also generates torque that is transferred to and reacted by the electric machine 20 to generate electric power that may be transferred and stored in an on-vehicle DC power source.

The EC mode may be associated with operating the powertrain 100 to enable the electric machine 20 to crank the engine 10 to effect engine starting. This may be part of an autostart/autostop operation. The EC mode is enabled by activating the second clutch 65 and deactivating the first clutch 60. In the EC mode, the electric machine 20 generates torque that is transferred via the first gear drive 30 and the second clutch 65 to spin the engine 10. The autostart/autostop operation is an engine stop/start operation that may occur during vehicle operation to stop operation of the engine 10 under certain conditions, such as when the vehicle is resting at a stop light, and restarting the engine 10 during a subsequent vehicle launch.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link, and is indicated by lines 16. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A powertrain, comprising:
  an internal combustion engine including a crankshaft coupled to a first input member;
  an electric machine including a rotor;
  a geartrain including a pump drive mechanism;
  a first clutch and a second clutch;
  a variator for a continuously variable transmission (CVT), the variator including an intermediate member and an output member; and
  a fluidic pump fluidly connected to the variator and rotatably operatively coupled to the electric machine via the pump drive mechanism of the geartrain;
  wherein:
    the first input member is rotatably coupled to the rotor of the electric machine by activation of the second clutch,
    the first input member is rotatably coupled to the intermediate member by activation of the first and second clutches,
    the rotor of the electric machine is rotatably coupled to the intermediate member by activation of the first clutch,
    the electric machine is operative in either a forward direction or a reverse direction, and
    the geartrain including the pump drive mechanism is disposed to operate the fluidic pump in a first direction when the electric machine is operating in the forward direction and when the electric machine is operating in the reverse direction.

2. The powertrain system of claim 1, wherein the geartrain further comprises a first gear drive, a second gear drive and a third gear drive, wherein the pump drive mechanism includes a rotating member coupled to an impeller of the fluidic pump, and wherein the second and third gear drives are rotatably couplable to the rotating member of the pump drive mechanism.

3. The powertrain of claim 2, wherein the first gear drive includes a planetary gear set including a sun gear, a plurality of planet gears rotatably coupled to a carrier, and a ring gear;
  wherein the sun gear is coupled to the rotor of the electric machine; and
  wherein the carrier is coupled to a first gear element of the second gear drive, a first element of the second clutch, and a first element of the first clutch.

4. The powertrain of claim 3, wherein the ring gear is coupled to a transmission ground.

5. The powertrain of claim 2, wherein the second gear drive includes a first gear element rotatably coupled to a second gear element, wherein the second gear element is coupled to the rotating element of the pump drive mechanism.

6. The powertrain of claim 5, wherein the first gear element is rotatably coupled to the second gear element via a mechanism that is disposed to rotate the second gear element in the same direction as the rotation of the first gear element.

7. The powertrain of claim 6, wherein the first gear element is rotatably coupled to the second gear element via a chain drive.

8. The powertrain of claim 2, wherein the third gear drive includes a third gear element rotatably coupled to a fourth gear element, wherein the fourth gear element is coupled to the rotating element of the pump drive mechanism.

9. The powertrain of claim 8, wherein the third gear element is rotatably coupled to the fourth gear element via a mechanism that is disposed to rotate the fourth gear element in a rotational direction that is opposite to the rotational direction of the third gear element.

10. The powertrain of claim 9, wherein the third and fourth gear elements comprise meshingly engaged gear elements.

11. The powertrain of claim 2,
  wherein the second gear drive includes a first gear element rotatably coupled to a second gear element,
  wherein the second gear element is coupled to the rotating element of the pump drive mechanism,
  wherein the first gear element is rotatably coupled to the second gear element via a mechanism that is disposed to rotate the second gear element in a direction that is opposite to the rotational direction of the first gear element,
  wherein the third gear drive includes a third gear element rotatably coupled to a fourth gear element, wherein the fourth gear element is coupled to the rotating element of the pump drive mechanism, and
  wherein the third gear element is rotatably coupled to the fourth gear element via a mechanism that is disposed to rotate the fourth gear element in the same rotational direction as the rotational direction of the third gear element.

12. The powertrain of claim 2, wherein the first input member of the internal combustion engine is coupled to a second element of the first clutch and a third gear element of the third gear drive.

13. The powertrain of claim 2, wherein the pump drive mechanism further comprises a first clutch backplate, a second clutch backplate and a clutch plate, and a reverse/forward actuator operatively coupled to the first and second clutch backplates;
  wherein the reverse/forward actuator is disposed to engage the first clutch backplate to the clutch plate to rotate the rotating member coupled to the impeller to operate the fluidic pump in the first direction when the electric machine is transferring mechanical power to the intermediate member in the forward direction; and
  wherein the reverse/forward actuator is disposed to engage the second clutch backplate to the clutch plate to rotate the rotating member coupled to the impeller to operate the fluidic pump in the first direction when the electric machine is transferring mechanical power to the intermediate member in the reverse direction.

14. The powertrain of claim 1, wherein the fluidic pump is disposed to transfer pressurized fluid to the variator when the pump drive mechanism operates the fluidic pump in the first direction.

15. The powertrain of claim 1, wherein the geartrain including the pump drive mechanism is disposed to operate the fluidic pump in a forward direction when the electric machine is transferring mechanical power to the intermediate member in the forward direction and when the electric machine is transferring mechanical power to the intermediate member in the reverse direction.

16. The powertrain of claim 1, wherein the variator includes an output member coupled to a driveline; and wherein:
  the powertrain is disposed to operate in an electric vehicle mode, including the electric machine being disposed to operate in a forward direction of rotation to transfer torque from the electric machine to the CVT when the first clutch is activated and the second clutch is deactivated;
  the powertrain is disposed to operate in an electrically variable mode, including the internal combustion engine and the electric machine being disposed to transfer torque to the CVT when the first and second clutches are activated;
  the powertrain is disposed to control operate in an engine cranking mode, including the electric machine being disposed to crank the engine when the second clutch is activated and the first clutch is deactivated; and
  the powertrain is disposed to operate in the electric vehicle mode in a reverse direction of travel, including controlling the electric machine to operate in a reverse direction of rotation to transfer torque from the electric machine to the CVT when the first clutch is activated and the second clutch is deactivated.

17. A device disposed to transfer torque originating from first and second torque generating devices to a driveline, the device comprising:
  a geartrain rotatably coupled to a variator of a continuously variable transmission (CVT);
  wherein the geartrain includes a first input member, a second input member, a first gear drive, a second gear drive, a third gear drive, a pump drive mechanism, a first clutch, a second clutch and an intermediate member;
  wherein the variator includes a first pulley that is rotatably coupled to a second pulley via a flexible continuous belt, wherein the first pulley rotatably couples to the intermediate member and wherein the second pulley rotatably couples to the driveline;
  wherein the pump drive mechanism includes a rotating member coupled to an impeller of a fluidic pump, wherein the second and third gear drives are rotatably couplable to the rotating member of the pump drive mechanism;
  wherein the fluidic pump is disposed to supply pressurized fluid to the variator and is selectively rotatably coupled to one of the first and second input members via the pump drive mechanism of the geartrain;
  wherein the first input member is rotatably coupled to the intermediate member by activation of the first and second clutches,
  wherein the second input member is rotatably coupled to the intermediate member by activation of the first clutch,
  wherein the pump drive mechanism is disposed to operate the fluidic pump in a first direction when the second input member is rotating in a forward direction and when the second input member is rotating in a reverse direction; and
  wherein the first input member is coupled to the first torque generating device and wherein the second input member is coupled to the second torque generating device.

18. The device of claim 17, wherein the pump drive mechanism further comprises a first clutch backplate, a second clutch backplate and a clutch plate, and a reverse/forward actuator operatively coupled to the first and second clutch backplates;
  wherein the reverse/forward actuator is disposed to engage the first clutch backplate to the clutch plate to rotate the rotating member coupled to the impeller to operate the fluidic pump in the first direction when the electric machine is transferring mechanical power to the intermediate member in the forward direction; and
  wherein the reverse/forward actuator is disposed to engage the second clutch backplate to the clutch plate to rotate the rotating member coupled to the impeller to operate the fluidic pump in the first direction when the second input member is rotating in the reverse direction.

19. The device of claim 18, wherein the geartrain including the pump drive mechanism is disposed to operate the fluidic pump in a forward direction when the second input member is rotating in the forward direction and when the second input member is rotating in the reverse direction.

* * * * *